C. W. BEAM.

POLISHING MACHINE.

APPLICATION FILED AUG. 20, 1913.

Reissued Mar. 31, 1914.

13,706.

2 SHEETS—SHEET 1.

WITNESSES:

Paul N. Critchlow

Arthur J. Tomasson

INVENTOR

Charles W. Beam by Christy and Christy

Atty's

C. W. BEAM.

POLISHING MACHINE.

APPLICATION FILED AUG. 20, 1913.

Reissued Mar. 31, 1914.

13,706.

2 SHEETS—SHEET 2.

WITNESSES:

Paul M. Critchlow

Francis J. Tomanow.

INVENTOR

Charles W. Beam by Christy and Christy

UNITED STATES PATENT OFFICE.

CHARLES W. BEAM, OF ROCHESTER, PENNSYLVANIA, ASSIGNOR TO H. C. FRY GLASS COMPANY, OF ROCHESTER, PENNSYLVANIA, A CORPORATION OF PENNSYLVANIA.

POLISHING-MACHINE.

13,706. Specification of Reissued Letters Patent. Reissued Mar. 31, 1914.

Original No. 1,037,852, dated September 10, 1912, Serial No. 653,666. Application for reissue filed August 20, 1913. Serial No. 785,822.

*To all whom it may concern:*

Be it known that I, CHARLES W. BEAM, residing at Rochester, in the county of Beaver and State of Pennsylvania, a citizen of the United States, have invented or discovered certain new and useful Improvements in Polishing-Machines, of which improvements the following is a specification.

My invention relates to polishing machines, and has particularly to do with machines for polishing curvilinear surfaces of glass, such for example as the exterior surfaces of blanks of glass used in the manufacture of reflectors.

The object of my invention is to provide an efficient and easily operated machine of the character described.

My invention is illustrated in the accompanying drawings, in which—

Figure 1:
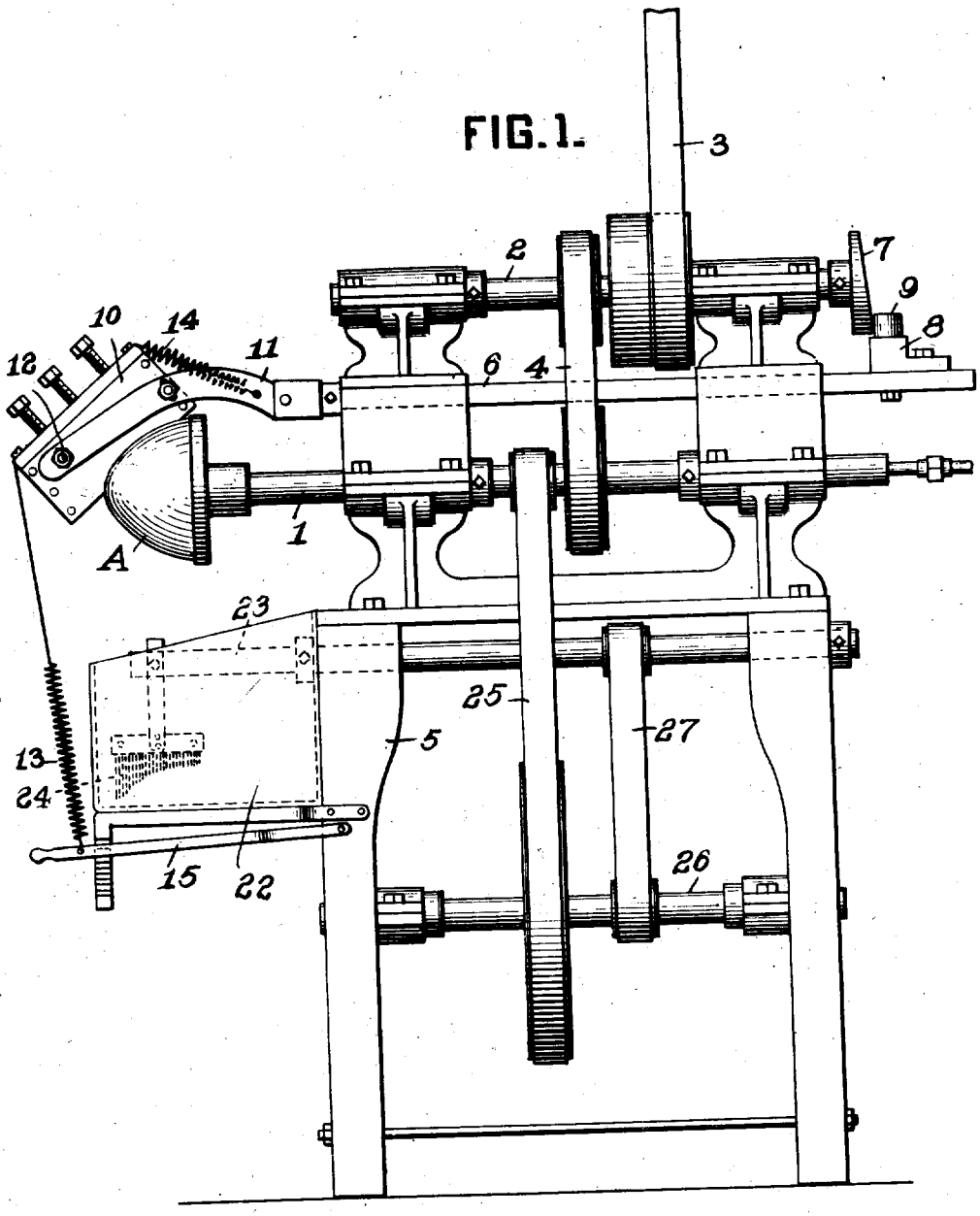
Figure 2:
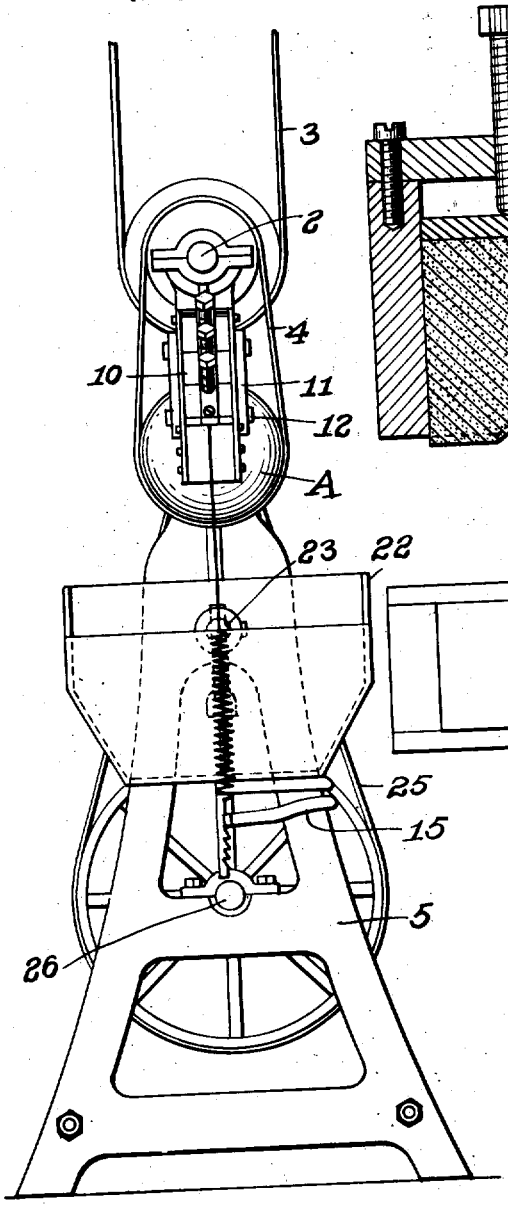
Figure 3:
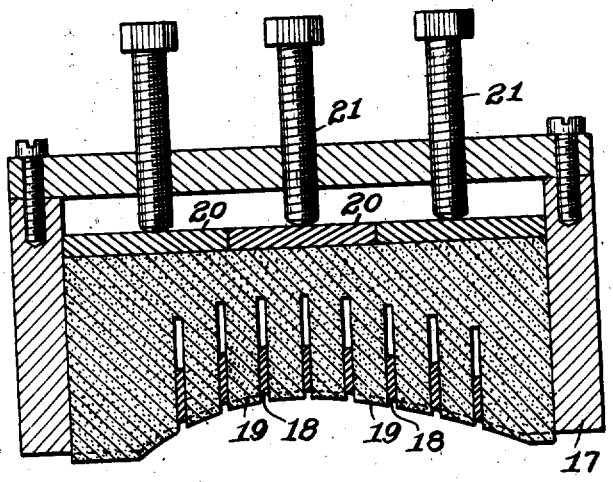
Figure 4:
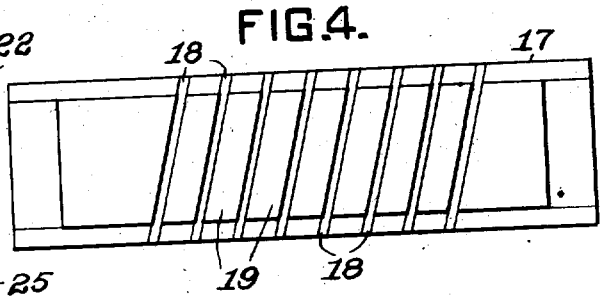

Figure 1 is a side elevation and Fig. 2 is an end elevation of my improved machine. Figs. 3 and 4 illustrate on larger scale and in section and elevation the polishing block of my machine.

In the several figures like numerals are used to designate like parts.

In the practice of my invention in its preferred form, I provide a rotatable shaft with suitable means to carry a blank and sustain it in polishing position, and I mount a polishing block to bear yieldingly against the surface of the blank to be polished when carried by the rotatable shaft first mentioned, and I provide means for reciprocating the said polishing block when in contact with the surface to be polished.

Referring to the drawings, the blank A to be polished, which in this particular illustration is a parabolic blank of glass adapted to be used as a reflector, is held on the end of a rotatable shaft 1, preferably by suction (an expedient well known to those skilled in the art) and the shaft 1 is mounted for rotation in a suitable frame 5. A second shaft 2 is mounted for rotation in the said frame 5. The shaft 2 is provided with suitable connection (belt 3) to a source of power, and a belt 4 connects the said shafts 1 and 2, the arrangement being such that the two shafts will rotate at different speeds for purposes to be hereinafter more fully explained. Between the said shafts 1 and 2, a carrier in the form of a rod 6 is mounted in the frame 5, in such a manner as to be held from rotation but free to oscillate longitudinally, and means are provided to cause the carrier to oscillate longitudinally. To this end I secure a disk 7 to the shaft 2, such disk being provided with a cam surface inclined to the axis of rotation of shaft 2, as is particularly shown in Fig. 1, and a block 8 provided with a bearing roller 9 is secured to the carrier 6, the arrangement being such that in the normal operation of the machine presently to be described the roller will bear upon the cam surface of disk 7.

The polishing block 10 may be secured to the carrier 6 in any suitable manner. To the end that the said block may be held yielding against the surface of the blank, I preferably form the carrier rod 6 with a forked termination 11, pivot the polishing-block as at 12 between the forks thereof, and attach a spring 13 to one end and a spring 14 to the other end of the said block. The opposite ends of the said springs may be secured respectively to the frame 5 of the machine and to carrier 6 or its bifurcated head 11. In order to provide an adjustment in the tension of the spring 13, I conveniently secure it to frame 5 through an adjustable arm 15, as shown in the drawings. The tension of spring 13, together with the particular disposition and mounting of the polishing block 10, hold roller 9 against the cam disk 7, and thus reciprocation of carrier rod 6 is effected by the rotation of shaft 2. It will be noted that, since shafts 1 and 2 rotate at different speeds, the oscillations of carrier 6 are not synchronous with the rotations of shaft 1.

The detail construction of the polishing-block is shown in Figs. 3 and 4 of the drawings. It consists preferably of a metal box-like casing 17, provided with bars 18, which extend from one side to the other of the said casing and are preferably angularly disposed with relation to its ends. Strips of felt 19, or other suitable polishing material of the proper proportions to fit into the said casing and extend between the bars 18, are placed within the casing and backed with the block 20, to form a buffer. These blocks may be made adjustable, as by screws 21, to the end that the said strips 19 may be moved outwardly as they wear down in service. The face of the buffer will correspond in shape to the article to be polished, and in this instance as the drawings show, the shape is parabolic.

In polishing glass, it is customary to apply a fluid polishing slurry of rouge to the surface being polished. I preferably provide a rouge dauber and correlate it in its movements to the movement of the shaft 1. A suitable open-topped rouge tank 22 may be secured to the frame 5; and a shaft 23, provided with a brush or dauber 24, may be operatively connected to the shaft 1, through belt 25, shaft 26, and belt 27, to the end that, as the shaft 2 rotates, the brush 24 carried by shaft 23 may alternately dip into the rouge and apply the rouge to the surface of the blank.

In the operation of my polishing machine, power may be received from a suitable source through the belt 3, and may be made effective by such means as those described to rotate the shaft 1, and to oscillate the spring-held carrier 6. The polishing-block is thus caused to move longitudinally upon the surface of the blank while the blank rotates, the relative movements being such as to effect an even and efficient polishing. At the same time the dauber being suitably placed and correlated in operation to the other parts of the machine, rouge for polishing is automatically supplied.

I do not wish to limit myself to the details of construction shown herein, for obviously many changes may be made by those skilled in the art without departing from the spirit of my invention.

I claim herein as my invention:

1. In a polishing-machine, the combination of a rotatable member holding a blank of material in operative polishing position, a polishing block mounted adjacent to said rotatable member and held yieldingly by means of a spring against a blank when in position on said rotatable member, means for rotating said rotatable member, and means for oscillating said polishing block, substantially as described.

2. In a polishing-machine, the combination of a rotatable shaft provided with a seat for a blank to be polished, an oscillatory carrier provided with a bifurcated head, a polishing block pivoted in the head of said carrier and spring-controlled in its pivotal movement, suitable means for rotating said shaft, and means for causing said carrier to oscillate non-synchronously with the rotation of said shaft, substantially as described.

3. In a polishing-machine, the combination of a rotatable blank holder adapted to hold a blank of material in polishing position, a polishing block mounted adjacent to said holder, a resilient spring for holding said block against a blank when in polishing position, means for rotating said holder, and means coördinated with the rotation of the blank holder for effecting a reciprocatory movement between said block and holder in a direction substantially parallel with the axis of rotation of said holder.

4. In a machine for polishing convex paraboloid surfaces, the combination of a rotatable blank holder adapted to hold in polishing position a blank with a paraboloid outer surface, the axis of the paraboloid being substantially coincident with the axis of rotation of the blank-holder, a polishing block mounted adjacent to said holder and in a position to bear upon such blank, means for rotating said holder, means coördinated with the rotation of the blank holder for effecting a reciprocatory movement between said block and holder in a direction substantially parallel with the paraboloid axis, and yielding means for holding said block in polishing contact with such paraboloid surface in its variable position thereon.

In testimony whereof I have hereunto set my hand.

CHARLES W. BEAM.

Witnesses:

LEMAN W. DOLBY,
ALBERT SULSER.